United States Patent Office 3,167,564
Patented Jan. 26, 1965

3,167,564
NEW PROCESS FOR THE PREPARATION OF THIAZOLE COMPOUNDS
Yasuo Yura, Shinagawa-ku, Tokyo, Japan, assignor to Sankyo Company, Limited, Tokyo, Japan
No Drawing. Filed May 2, 1962, Ser. No. 191,745
Claims priority, application Japan, May 13, 1961, 16,406/61, 16,408/61
4 Claims. (Cl. 260—302)

This invention relates to a new process for the preparation of thiazole compounds. More particularly, it relates to a new process for preparing 2,4-disubstituted thiazole compounds having the formula

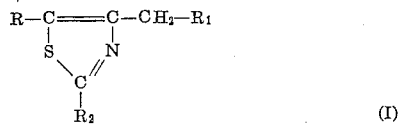

(I)

wherein R is a member selected from the group consisting of hydrogen atom, unsubstituted and substituted phenyl groups and naphthyl group, $R_1$ is a member selected from the group consisting of hydrogen atom, lower alkyl containing from 1 to 8 carbon atoms, unsubstituted and substituted phenyl groups and naphthyl group and $R_2$ is a member selected from the group consisting of amino and mercapto groups. As the unsubstituted and substituted phenyl groups there may be mentioned phenyl, halogen-substituted phenyl, for example, p-chlorophenyl and p-bromophenyl, alkyl-substituted phenyl, for example, p-methylphenyl and p-ethylphenyl, alkoxy-substituted phenyl, for example, p-methoxyphenyl and p-ethoxyphenyl, p-nitrophenyl and the like.

Heretofore, there are described in literatures a number of processes for preparing 2-amino- or 2-mercapto-thiazole compounds. While processes for preparing 2-amino- or 2-mercaptothiazole compounds are known, as aforesaid, these processes leave much to be desired. Among the known methods for the preparation of 2-amino- or 2-mercaptothiazole compounds, the method starting from α-haloketone compounds and thiourea or ammonium dithiocarbamate according to the method described in Org. Syntheses 19, 10 (1939), by J. R. Byers and J. B. Dickey or one described in J. Org. Chem. 6, 764 (1941) by E. R. Buchman et al. might be considered to be the most desirable one. However, as it is in general difficult to obtain pure α-haloketone compounds, use of said compounds as the starting material for formation of the thiazole nucleus would be disadvantageous.

It is an object of this invention to provide a new, technically-simple and commercially-feasible process for preparing 2,4-disubstituted thiazole compounds having the Formula I.

Other objects will become apparent from the following description.

As a result of studies made in order to find an improved process of preparing 2-amino- or 2-mercaptothiazole compounds, I have attained the foregoing and other objects in accordance with the present invention by reacting α-halogenoacetylene compounds having the formula $$R-CH-C\equiv CR_1$$
$$\underset{X}{|}$$

(II)

wherein X is halogen atom, and R and $R_1$ have the same meaning as described above with thiourea or ammonium dithiocarbamate to give 2,4-disubstituted compounds having the Formula I. Use of the compound of the Formula II in the process according to the present invention is particularly advantageous because the starting material (II) can be obtained in pure state by reacting aldehyde compounds (III) with acetylene compounds (IV) to form α-acetylene-alcohol compounds (V) and reacting the latter compounds with a halogenating agent such as phosphorous tribromide, phosphorous trichloride or thionyl chloride in accordance with the following equation:

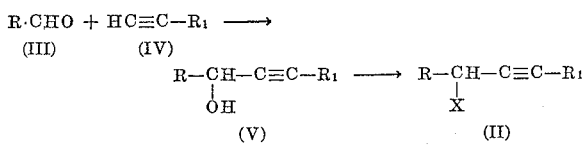

wherein R, $R_1$ and X have the same meaning as defined above.

The reactions in the process according to the present invention may be chemically represented by the following equation:

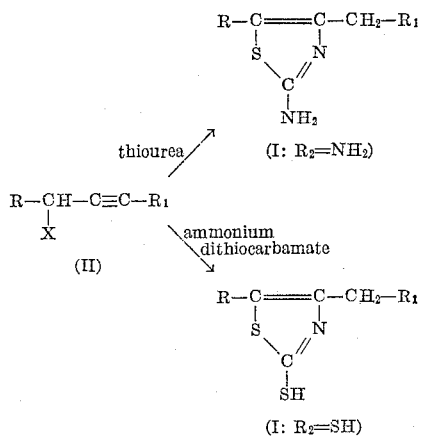

*Preparation of 2-aminothiazole compounds* (I: $R_2=NH_2$).—The desired products 2-aminothiazole compounds (I: $R_2=NH_2$) are obtained by reacting α-halogenoacetylene compounds (II) with thiourea, as aforesaid. In carrying out this process, the reaction is conveniently effected by heating under reflux the reactants to be used in an inert organic solvent such as methanol, aqueous methanol, ethanol, aqueous ethanol, acetone or the like. The reactants are usually used in the range of ratio of about 1–2 moles of thiourea per mole of α-halogeno-acetylene compound. The time required for the reaction is about 1 to 20 hours.

After completion of the reaction, the reaction product is isolated from the reaction mixture by one of the conventional methods. For example, after completion of the reaction, the organic solvent is distilled off, the residue is washed with an aqueous alkali such as aqueous sodium hydroxide, aqueous potassium hydroxide, aqueous sodium carbonate or aqueous potassium carbonate and the residual free base is extracted with an organic solvent such as diethyl ether or chloroform. The solvent is removed from the extract and the residue is subjected to distillation or recrystallization to obtain the desired product.

*Preparation of 2-mercaptothiazole compounds* (I: $R_2=SH$).—The desired products, 2-mercaptothiazole compounds (I: $R_2=SH$) are obtained by reacting α-halogenoacetylene compounds (II) with ammonium dithiocarbamate, as aforesaid. In carrying out this process, the reaction is conveniently effected by heating under reflux the reactants in an inert organic solvent such as methanol, aqueous methanol, ethanol, aqueous ethanol or acetone. The reactants are usually used in the range of ratio of about 1 mole per mole of α-halogenoacetylene compound. The time required for the reaction is about 10 minutes to about 1 hour.

After completion of the reaction, the reaction product is isolated from the reaction mixture by one of the conventional methods. For example, after completion of the reaction, inorganic salt which precipitates is filtered off, the organic solvent is removed from the filtrate and then the residue is purified. For effecting purification, the residue is recrystallized from an organic solvent when the residue is solid material or a solution of the residue in ethanol is treated with methyl iodide and the resulting methylmercaptothiazole compound is distilled when the residue is oily material.

Representative of the α-halogenoacetylene compounds having the Formula II used as the starting material in the process according to the present invention are the following:

3-bromo-1-propyne;
1-bromo-2-hexyne;
3-bromo-1-phenyl-1-propyne;
3-bromo-1-(p-chlorophenyl)-1-propyne;
3-bromo-1-(p-nitrophenyl)-1-propyne;
3-chloro-3-phenyl-1-propyne;
3-chloro-1,3-diphenyl-1-propyne;
3-chloro-3-(p-chlorophenyl)-1-propyne;
3-chloro-3-(p-methoxyphenyl)-1-propyne;
3-chloro-3-(α-naphthyl)-1-propyne;
3-bromo-1-(p-tolyl)-1-propyne;
3-bromo-1-(α-naphthyl)-1-propyne;
3-chloro-3-phenyl-1-(p-chlorophenyl)-1-propyne;
3-chloro-3-(p-methoxyphenyl)-1-(p-nitrophenyl)-1-propyne;
3-chloro-3-(α-naphthyl)-1-phenyl-1-propyne;
1-bromo-2-butyne;
3-bromo-1-butyne;
3-bromo-4-octyne;
3-bromo-1-phenyl-1-butyne;
1-chloro-1-phenyl-2-hexyne.

The above-mentioned α-halogenoacetylene compounds are converted by the process according to the present invention to the corresponding thiazole compounds as follows:

2-amino-4-methylthiazole;
2-amino-4-n-butylthiazole;
2-amino-4-benzylthiazole;
2-amino-4-(p-chlorobenzyl) thiazole;
2-amino-4-(p-nitrobenzyl) thiazole;
2-amino-4-methyl-5-phenylthiazole;
2-amino-4-benzyl-5-phenylthiazole;
2-amino-4-methyl-5-(p-chlorophenyl) thiazole;
2-amino-4-methyl-5-(p-methoxyphenyl) thiazole;
2-amino-4-methyl-5-(α-naphthyl) thiazole;
2-amino-4-(p-methyl-benzyl) thiazole;
2-amino-4-(α-naphthyl methyl) thiazole;
2-amino-4-(p-chlorobenzyl)-5-phenylthiazole;
2-amino-4-(p-nitrobenzyl)-5-(p-methoxyphenyl) thiazole;
2-amino-4-benzyl-5-(α-naphthyl) thiazole;
2-mercapto-4-ethylthiazole;
2-mercapto-4,5-dimethylthiazole;
2-mercapto-4-butyl-5-ethylthiazole;
2-mercapto-4-benzyl-5-methylthiazole;
2-mercapto-4-butyl-5-phenylthiazole.

The following examples describe ways in which the invention has been practiced, but are not to be construed as limiting its scope.

EXAMPLE 1

*Preparation of 2-amino-4-methylthiazole*

A mixture of 5 g. of 3-bromo-1-propyne, 6.4 g. of thiourea and 10 ml. of 99% ethanol is heated under reflux on a steam bath for 2 hours. After the ethanol is distilled off, the residue is dissolved in 10 ml. of water and the solution obtained is made alkaline with sodium hydroxide and extracted with diethyl ether. The diethyl ether extract is dried over solid sodium hydroxide, the diethyl ether is distilled off from the extract and the residue is distilled under reduced pressure. There is obtained 2.8 g. (50% of the theoretical amount) of the desired product which is an oily substance boiling at 110° C. at 8 mm. Hg. It gives a picrate melting at 228° C. with decomposition.

*Analysis.*—Calc'd for $C_{10}H_9O_7N_4S$: C, 35.00; H, 2.62; N, 20.41. Found: C, 34.97; H, 2.88; N, 20.38.

EXAMPLE 2

*Preparation of 2-amino-4-benzylthiazole*

A mixture of 10 g. of 3-bromo-1-phenyl-1-propyne, 8.6 g. of thiourea and 40 ml. of 99% ethanol is heated under reflux on a steam bath for 2 hours. After the reaction is completed, the reaction mixture is treated in a manner similar to that described in Example 1 to give a crude crystalline substance, which is recrystallized from benzene. The desired product is white needles melting at 92 to 93° C. yield 48%.

*Analysis.*—Calc'd for $C_{10}H_{10}N_2S$: C, 63.15; H, 5.26; N, 14.73. Found: C, 63.28; H, 5.49; N, 14.56.

EXAMPLE 3

*Preparation of 2-amino-4-(p-chlorobenzyl) thiazole*

A mixture of 3 g. of 3-bromo-1-(p-chlorophenyl)-1-propyne, 1.5 g. of thiourea and 7 ml. of 99% ethanol is heated under reflux for 2 hours. The ethanol is distilled off from the reaction mixture and the residue is treated in a manner similar to that described in Example 1 to give a crude crystalline substance. Recrystallization of the crude crystalline substance from benzene gives 1.5 g. (35% of the theoretical amount) of the desired product which is white needles melting at 146° C.

*Analysis.*—Calc'd for $C_{10}H_9N_2SCl$: C, 53.45; H, 4.02; N, 12.50. Found: C, 53.48; H, 4.21; N, 12.07.

EXAMPLE 4

*Preparation of 2-amino-4-methyl-5-phenylthiazole*

A mixture of 5 g. of 3-chloro-3-phenyl-1-propyne, 3 g. of thiourea and 10 ml. of 99% ethanol is heated under reflux for 2 hours. The reaction mixture is treated in a manner similar to that described in Example 1 to give a crude product which is recrystallized from benzene. There is obtained 4 g. (63.3% of the theoretical amount) of the desired product melting at 163° C.

*Analysis.*—Calc'd for $C_{10}H_{10}N_2S$: C, 63.28; H, 5.23; N, 14.66. Found: C, 63.39; H, 5.23; N, 14.63.

EXAMPLE 5

*Preparation of 2-amino-4-methyl-5-(p-chlorophenyl) thiazole*

A mixture of 5 g. of 3-chloro-3-(p-chlorophenyl)-1-propyne, 3 g. of thiourea and 10 ml. of 99% ethanol is heated under reflux for 2 hours. After the ethanol is distilled off from the reaction mixture, the residue is made alkaline with aqueous sodium hydroxide solution and extracted with diethyl ether. The extract is dried over anhydrous potassium carbonate, the ether is distilled off from the extract and the resulting crude crystalline substance is recrystallized from benzene to obtain 2.7 g. (45.5% of the theoretical amount) of the desired product melting at 188.5–189° C.

*Analysis.*—Calc'd for $C_{10}H_9N_2SCl$: C, 53.45; H, 4.02; N, 12.50. Found: C, 53.51; H, 4.00; N, 12.21.

EXAMPLE 6

*Preparation of 2-amino-4-methyl-5-(α-naphthyl) thiazole*

A mixture of 5 g. of 3-chloro-3-(α-naphthyl)-1-propyne, 2.8 g. of thiourea and 10 ml. of 99% ethanol is heated under reflux for 2 hours. The reaction mixture is treated in a manner similar to that described in Example 1 and the resulting product is recrystallized from benzene to obtain 1.2 g. of the desired product melting at 160–161° C.

Analysis.—Calc'd for $C_{14}H_{12}N_2S$: C, 70.00; H, 5.00; N, 11.66. Found: C, 70.45; H, 4.97; N, 11.87.

EXAMPLE 7

*Preparation of 2-amino-4-benzyl-5-phenylthiazole*

A mixture of 3-chloro-1,3-diphenyl-1-propyne, 2.5 g. of thiourea and 20 ml. of 99% ethanol is heated under reflux for 2 hours. The ethanol is distilled off from the reaction mixture, the residue is made alkaline with sodium hydroxide and extracted with diethyl ether. The extract is dried over anhydrous potassium carbonate, the ether is distilled off from the extract and the residue is recrystallized from benzene to obtain 5 g. (87% of the theoretical amount) of the desired product melting at 137.5–139° C.

Analysis.—Calc'd for $C_{16}H_{14}N_2S$: C, 72.25; H, 5.26; N, 10.55. Found: C, 72.46; H, 5.08; N, 10.64.

EXAMPLE 8

*Preparation of 2-amino-4-n-butylthiazole*

A mixture of 10 g. of 1-bromo-2-hexyne, 6 g. of thiourea and 30 ml. of 99% ethanol is heated under reflux for 15 hours. The reaction mixture is treated in a manner similar to that described in Example 1 and the resulting crude product is treated with alcoholic picric acid solution to obtain 0.5 g. of a yellow crystalline picrate of the desired product. It melts at 180–182° C. after recrystallized from ethanol.

Analysis.—Calc'd for $C_7H_{12}N_2S \cdot C_6H_3O_7N_3$: C, 39.6; H, 3.96; N, 18.46. Found: C, 39.55; H, 3.87; N, 18.25.

EXAMPLE 9

*Preparation of 2-amino-4-(p-nitrobenzyl) thiazole*

A mixture of 3.1 g. of 3-bromo-1-(p-chlorophenyl)-1-propyne, 3 g. of thiourea and 30 ml. of 99% ethanol is heated under reflux for 2 hours. The ether is distilled off from the reaction mixture, the residue is treated in a manner similar to that described in Example 1 and the resulting crude product is recrystallized from benzene to obtain 1.7 g. (56% of the theoretical amount) of the desired product as pale yellow needles melting at 172° C.

Analysis.—Calc'd for $C_{10}H_9N_3O_2S$: C, 51.06; H, 3.83; N, 17.83. Found: C, 50.98; H, 3.78; N, 17.66.

EXAMPLE 10

*Preparation of 2-amino-4-methyl-5-(p-methoxylphenyl) thiazole*

A mixture of 18 g. of 3-chloro-3-(p-methoxyphenyl)-1-propyne, 10 g. of thiourea and 15 ml. of 99% ethanol is heated under reflux for 2 hours. The ethanol is distilled off from the reaction mixture, the residue is treated in a manner similar to that described in Example 1 and the resulting crude crystalline substance is recrystallized from benzene to obtain 16.5 g. (75% of the theoretical amount) of the desired product as white needles melting at 187–188° C.

Analysis.—Calc'd for $C_{11}H_{12}N_2OS$: C, 60.00; H, 5.45; N, 12.73. Found: C, 59.81; H, 5.50; N, 12.65.

EXAMPLE 11

*Preparation of 2-methylmercapto-4-methylthiazole*

To a mixture of 10 g. of ammonium dithiocarbamate and 40 ml. of anhydrous ethanol is added dropwise 10 g. of 3-bromo-1-propyne and the mixture is heated under reflux for 45 minutes. Precipitates are filtered off from the reaction mixture and 8 g. of methyl iodide is added to the filtrate. After the filtrate is allowed to stand for 3 hours, the ethanol is distilled off and the residue is treated with aqueous sodium hydroxide solution. Oily substance which thereby separates is extracted with diethylether, the extract is dried over potassium carbonate, the diethyl ether is distilled off and the residue is distilled under reduced pressure. There is obtained 1.3 g. of the desired product boiling at 68° C. at 3 mm. Hg. It gives a picrate melting at 123–124° C. The analysis of the picrate is as follows:

Calculated: C, 40.35; H, 3.03; N, 17.12. Found: C, 40.55; H, 3.23; N, 17.09.

EXAMPLE 12

*Preparation of 2-mercapto-4.5-dimethylthiazole*

A mixture of 2.5 g. of 3-bromo-1-butyne, 3 g., of ammonium dithiocarbamate and 7 ml. of anhydrous ethanol is heated under reflux on a steam bath for 1 hour. Ammonium bromide which thereby precipitates is filtered off, the ethanol is distilled off from the filtrate and the residue is recrystallized from ethyl acetate to obtain the desired product melting at 152–153° C.

Analysis.—Calc'd for $C_5H_7NS_2$: C, 41.32; H, 4.83; N, 9.67. Found: C, 41.41; H, 4.92; N, 9.60.

EXAMPLE 13

*Preparation of 2-methylmercapto-4-benzylthiazole*

A mixture of 7.1 g. of 3-bromo-1-phenyl-1-propyne, 4 g. of ammonium dithiocarbamate and 20 ml. of anhydrous ethanol is heated under reflux on a steam bath for 45 minutes. Precipitates formed are filtered off, 2.6 g. of methyl iodide is added to the filtrate and the mixture is allowed to stand at room temperature for 48 hours. Water and sodium hydroxide are added to the mixture and oily substance separated is extracted with diethyl ether, the extract is dried over potassium carbonate, the ether is distilled off from the extract and the residue is distilled under reduced pressure to obtain the desired product boiling at 120–125° C. at 0.08 mm. Hg. It gives a picrate melting at 201° C. and having the following data of analysis:

Calc'd for $C_{11}H_{11}NS_2 \cdot C_6H_3O_7N_3$: C, 45.35; H, 3.11; H, 24.88. Found: C, 45.10; H, 3.08; N, 24.59.

EXAMPLE 14

*Preparation of 2-mercapto-4-ethylthiazole*

To a mixture of 11 g. of ammonium dithiocarbamate and 40 ml. of anhydrous ethanol is added dropwise 13.3 g. of 1-bromo-2-butyne and the mixture is heated under reflux on a steam bath for 1 hour. Precipitates formed are filtered off, the ethanol is distilled off and the residue is recrystallized from ethyl acetate to give 8.5 g. (59.5% of the theoretical amount) of the desired product melting at 87° C.

Analysis.—Calc'd for $C_5H_7NS_2$: C, 41.95; H, 4.89; N, 9.78. Found: C, 42.05; H, 4.90; N, 9.74.

EXAMPLE 15

*Preparation of 2-mercapto-4-butylthiazole*

To a mixture of 10.6 g. of ammonium diethiocarbamate and 40 ml. of anhydrous ethanol is added dropwise 10 g. of 1-bromo-2-hexyne and the mixture is heated under reflux on a steam bath for 1 hour. The reaction mixture is treated in a manner similar to that described in Example 14 to obtain 5 g. (47% of the theoretical amount) of the desired product having the following data of analysis:

Calc'd for $C_8H_{13}NS_2$: C, 51.89; H, 7.03; N, 7.55. Found: C, 51.69; H, 6.97; N, 7.60.

EXAMPLE 16

*Preparation of 2-methylmercapto-4-methyl 5-phenylthiazole*

To a mixture of 11 g. of ammonium dithiocarbamate and 40 ml. of anhydrous ethanol is added dropwise 15 g. of 3-chloro-3-phenyl-1-propyne and the mixture is heated under reflux on a steam bath for 45 minutes. Precipitates thus formed are filtered off and 14 g. of methyl iodide is added to the filtrate. After the filtrate is allowed to stand for 3 hours, the ethanol is distilled off from the filtrate, the residue is treated with aqueous sodium hydroxide solution and oily substance thereby separated is extracted with diethyl ether. The extract is dried over potassium carbonate, diethyl ether is distilled off and the residue is distilled under reduced pressure to obtain 16.8 g. (76% of the theoretical amount) of the desired product boiling at 90–100° C. at 0.05 mm. Hg.

*Analysis*—Calc'd for $C_{11}H_{11}NS_2$: C, 59.72; H, 4.97; N, 6.33. Found: C, 60.22; H, 4.89; N, 6.05.

EXAMPLE 17

*Preparation of 2-mercapto-4-butyl-5-ethylthiazole*

To a mixture of 11 g. of ammonium dithiocarbamate and 50 ml. of anhydrous ethanol is added dropwise 19 g. of 3-bromo-4-octyne and the mixture is heated under reflux on a steam bath for 1 hour. The reaction mixture is treated in a manner similar to that described in Example 14 to obtain 12.5 g. (62.2% of the theoretical amount) of the desired product having the following analysis:

Calc'd for $C_9H_{15}NS_2$: C, 53.72; H, 7.46; N, 6.96. Found: C, 53.82; H, 7.52; N, 6.85.

EXAMPLE 18

*Preparation of 2-mercapto-4-benzyl-5-phenylthiazole*

To a mixture of 5 g. of ammonium dithiocarbamate and 30 ml. of anhydrous ethanol is added dropwise 10 g. of 3-chloro-1,3-diphenyl-1-propyne (boiling point: 90–100° C./8.5×10⁻⁴ mm. Hg) and the mixture is heated under reflux on a steam bath for 1 hour. The reaction mixture is treated in a manner similar to that described in Example 14 to obtain 9.5 g. (76% of the theoretical amount) of the desired product melting at 164° C.

*Analysis.*—Calc'd for $C_{16}H_{13}NS_2$: C, 67.87; H, 4.59; N, 4.95. Found: C, 68.02; H, 4.63; N, 4.89.

I claim:

1. A process for the preparation of a compound having the formula

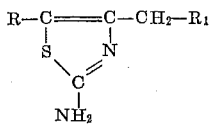

wherein R is a member selected from the group consisting of hydrogen, unsubstituted phenyl, phenyl substituted with a member selected from the group consisting of halogen, nitro and alkoxy of 1 to 3 carbon atoms, and naphthyl and $R_1$ is a member selected from the group consisting of hydrogen, lower alkyl of from 1 to 8 carbon atoms, unsubstituted phenyl, phenyl substituted with a member selected from the group consisting of halogen, nitro and alkoxy of 1 to 3 carbon atoms, and naphthyl, which comprises heating under reflux and in an inert organic solvent a compound having the formula

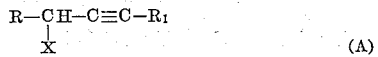

wherein R and $R_1$ have the same meaning as described above and X is halogen with thiourea and recovering the resulting compound from the reaction mixture.

2. A process for the preparation of a compound having the formula

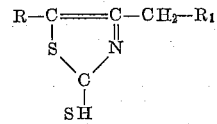

wherein R is a member selected from the group consisting of hydrogen, unsubstituted phenyl, phenyl substituted with a member selected from the group consisting of halogen, nitro and alkoxy of 1 to 3 carbon atoms, and naphthyl and $R_1$ is a member selected from the group consisting of hydrogen, lower alkyl of from 1 to 8 carbon atoms, unsubstituted phenyl, phenyl substituted with a member selected from the group consisting of halogen, nitro and alkoxy of 1 to 3 carbon atoms, and naphthyl which comprises heating under reflux and in an inert organic solvent a compound having the formula

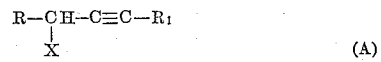

wherein R and $R_1$ have the same meaning as described above and X is halogen atom with ammonium dithiocarbamate and recovering the resulting compound from the reaction mixture.

3. A process as claimed in claim 1, wherein the mole ratio between said thiourea and said compound (A) is about between 1:1 to 2:1.

4. A process as claimed in claim 2, wherein the mole ratio between said ammonium dithiocarbamate and said compound (A) is about 1:1.

No references cited.

IRVING MARCUS, *Primary Examiner.*

NICHOLAS S. RIZZO, *Examiner.*